(12) United States Patent
Leung et al.

(10) Patent No.: US 9,306,239 B2
(45) Date of Patent: *Apr. 5, 2016

(54) STARCH-BASED BATTERY SYSTEM

(71) Applicants: Wing Fai Leung, Wanchai (HK); Po Fong Cheng, Wanchai (HK)

(72) Inventors: Wing Fai Leung, Wanchai (HK); Po Fong Cheng, Wanchai (HK)

(73) Assignee: G. CONCEPT TECHNOLOGY LTD., Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/544,657

(22) Filed: Jan. 30, 2015

(65) Prior Publication Data

US 2015/0155593 A1      Jun. 4, 2015

Related U.S. Application Data

(63) Continuation of application No. 12/932,481, filed on Feb. 25, 2011, now Pat. No. 8,974,973.

(60) Provisional application No. 61/396,466, filed on May 27, 2010.

(51) Int. Cl.
*H01M 10/0565* (2010.01)
*H01M 6/34* (2006.01)
*H01M 6/38* (2006.01)
*H01M 6/36* (2006.01)
(Continued)

(52) U.S. Cl.
CPC ........... *H01M 10/0565* (2013.01); *A01K 85/01* (2013.01); *H01M 4/12* (2013.01); *H01M 4/381* (2013.01); *H01M 4/463* (2013.01); *H01M 4/9041* (2013.01); *H01M 4/92* (2013.01); *H01M 6/06* (2013.01); *H01M 6/32* (2013.01); *H01M 6/34* (2013.01); *H01M 6/36* (2013.01); *H01M 6/38* (2013.01); *H01M 10/4257* (2013.01); *H01M 12/04* (2013.01); *H01M 12/06* (2013.01); *H01M 4/8657* (2013.01); *H01M 6/30* (2013.01); *H01M 2004/8689* (2013.01); *H01M 2010/4271* (2013.01); *H01M 2220/30* (2013.01); *H01M 2300/0002* (2013.01); *H01M 2300/0085* (2013.01); *Y10T 29/49108* (2015.01); *Y10T 29/49115* (2015.01)

(58) Field of Classification Search
CPC ........... H01M 6/30; H01M 6/32; H01M 6/34; H01M 6/36; H01M 6/38
See application file for complete search history.

(56) References Cited

U.S. PATENT DOCUMENTS 3,382,102 A * 5/1968 Zito, Jr. ........................ 429/82
4,037,032 A * 7/1977 Nidola et al. ................. 429/199
(Continued)

*Primary Examiner* — Jeremiah Smith
(74) *Attorney, Agent, or Firm* — James A. Gavney, Jr.; Jag Patent Services

(57) ABSTRACT

The present invention is directed to a starch-based battery system. The starch-based battery system uses a rheological and replaceable starch gluten electrolyte that generates colloidal starch gel adhesive contacted with and/or attached on electrodes to generate current for powering electronic devices. The starch-based battery system that includes control circuit and standard cap module replaces a conventional dry cell battery or is integrated with electronic devices to power, for example, flash-light, lighting ornaments or magnetic actuated motion products and toys. In other embodiments of the invention, the starch-based battery system is integrated into a device for attracting aquatic life forms in an aquatic environment, wherein the starch-based battery powers a light source and/or sound source and also the starch gluten electrolyte acts as bait for attracting aquatic life forms within the aquatic environment.

27 Claims, 6 Drawing Sheets

(51) Int. Cl.

| | | |
|---|---|---|
| *H01M 6/32* | (2006.01) | |
| *A01K 85/01* | (2006.01) | |
| *H01M 4/12* | (2006.01) | |
| *H01M 6/06* | (2006.01) | |
| *H01M 10/42* | (2006.01) | |
| *H01M 4/90* | (2006.01) | |
| *H01M 4/92* | (2006.01) | |
| *H01M 12/06* | (2006.01) | |
| *H01M 4/38* | (2006.01) | |
| *H01M 4/46* | (2006.01) | |
| *H01M 12/04* | (2006.01) | |
| *H01M 6/30* | (2006.01) | |
| *H01M 4/86* | (2006.01) | |

(56) References Cited

U.S. PATENT DOCUMENTS

| | | | |
|---|---|---|---|
| 2004/0202939 A1* | 10/2004 | Clarke et al. | 429/300 |
| 2006/0204854 A1* | 9/2006 | Fujimoto et al. | 429/303 |
| 2009/0013583 A1* | 1/2009 | Leung et al. | 43/17.5 |
| 2009/0127104 A1* | 5/2009 | Remonen et al. | 204/230.5 |
| 2010/0021806 A1* | 1/2010 | Simon et al. | 429/116 |
| 2010/0099010 A1* | 4/2010 | Niessen et al. | 429/40 |

* cited by examiner

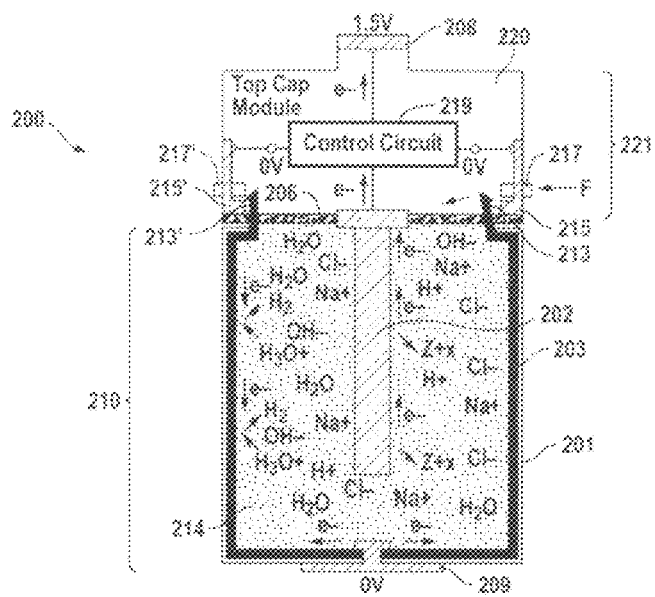
FIG. 2A
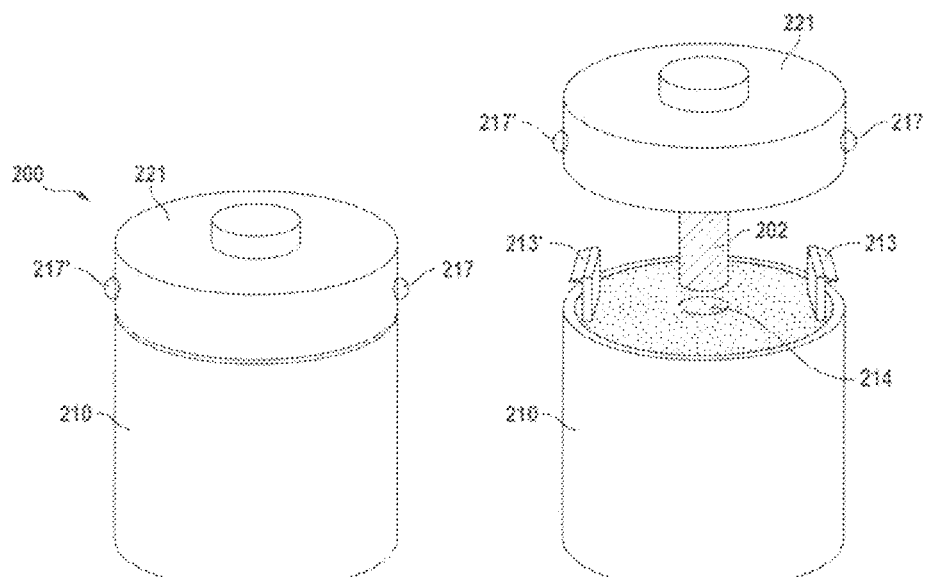
FIG. 2B
FIG. 2C

STARCH-BASED BATTERY SYSTEM

RELATED APPLICATION

This application is a continuation application of co-pending U.S. patent application Ser. No. 12/932,481, filed on Feb. 25, 2011, and titled "STARCH-BASED BATTERY SYSTEM", which claims priority under 35 U.S.C. 119 (e) of the U.S. Provisional Patent Application Ser. No. 61/396,466 filed May 27, 2010, and titled "STARCH COLLOID BATTERY SYSTEM." The U.S. patent application Ser. No. 12/932,481, filed on Feb. 25, 2011, and titled "STARCH-BASED BATTERY SYSTEM", and the U.S. Provisional Patent Application Ser. No. 61/396,466 filed May 27, 2010, and titled "STARCH COLLOID BATTERY SYSTEM" are both hereby incorporated by reference.

FIELD OF THE INVENTION

This invention relates to a battery system with a replaceable starch-based colloid electrolyte and detachable electrolyte container. More particularly, the present invention relates to a starch-based colloid battery system that is capable of generating a starch adhesive colloid and provides electrochemical energy.

BACKGROUND OF THE INVENTION

Since the invention of the first galvanic cell by Alessandro Volta around in year 1800, various types of primary and secondary batteries, such as wet and dry batteries have been developed. A typical wet battery, for example, is Lead-acid battery. Lead-acid batteries include non-environmental friendly materials including sulphuric acid liquid electrolyte and lead electrodes. Non-rechargeable dry batteries include materials such as Zinc Carbon, Zinc Chloride, Mercuric oxide and Zinc, while rechargeable dry batteries include materials such as Nickel cadmium (NiCd), Nickel-metal hydride (NiMH) and Lithium ion (Li-ion).

In the case of dry batteries with non-replaceable electrolytes, they need to be disposed of after the useful life time of the battery has expired. While some wet batteries can have the electrolyte replenished, the process is generally hazardous and can lead to spilling of caustic materials.

Regardless, whether the battery is a wet battery or a dry battery, the disposal of the toxic material used in their fabrication pose a environment threat. This is especially true of the disposal of the heavy metals that often end up in the water system and affects both land organisms and aquatic organisms. Further, the bioaccumulation of these materials in the food chain results in negative long term effects on the ecological environment.

A conventional battery is not waterproof and cannot be directly used in water. For underwater applications, batteries typically must be encased in a waterproof housing structure or sealant to prevent water from diluting the electrolyte and the corroding electrodes.

SUMMARY OF THE INVENTION

The Characteristics of the Starch-Based Colloid Compound:
Starch is a polysaccharide that consists of polymers of the glucose units linking together to form a long chain of a starch protein polymer. Starch is mainly produced by green plants. Many starch polymers join together and form a single starch granule. Starch exists in the cereal grains, seeds, leaves or roots of plants such as wheat, maize (corn), potatoes, rice and cassava. Starch from grains is one of the most plentiful food sources for humans, animals and fish.

Pure starch is a white, tasteless and odorless powder. Starch mainly includes two types of starch protein complex molecules; amylose and amlopectin. Amylose is the linear helical structure and amlopectin is a branched structure. Different types of plant starch carry different ratios of amylose and amylopectin molecules. For example, wheat starch contains approximately 26% amylose and approximately 74% amylopectin. Amylose is water insoluble whereas amylopectin is easily dissolved in water, even when the water is cold. Because of van der waals force, hydrogen bonding and covalent bonding that exists between these polymer chains of linear helical amylose and the branched amylopectin, complex starch protein molecules are tightly bound in crystalline forms of starch.

While linear helical amylose is hard to dissolve in water, even at elevated temperatures, hot water molecules still diffuse and osmosis into the crystalline structure of granules to form a starch gelatin. In other words, starch amylose and amylopectin molecules are capable of being hydrated to form viscous starch gel at a certain thermal temperature, referred to as the starch gelatinization temperature. For example, unmodified native starches start gelatinization at about 55 degrees Celsius and other types of starch at about 85 degrees Celsius. Wheat starch starts gelatinizing at about 50 degrees Celsius.

In the starch gelatinization process, hot water is absorbed by the surface layer of the starch granules and the strength of the hydrogen bonding in between the starch polymers within the starch granule is reduced, which allows further water molecules to osmosis into the granules. Some of the starch amylose is released from the starch granules surface and the crystalline structure of the starch granules becomes porous. The starch granules then take on more water and continue to swell. Eventually the amylose and amylopectin diffuse from the crystalline phase to form a dispersion with colloidal characteristics. A starch gel adhesive is conventionally formed by a process of repeated water heating, water absorption and starch molecule hydration.

When the gelatinized starch gel adhesive is cooled below room temperature, the dispersed amylose molecules move closer together to re-form the hydrogen bonds and eventually re-align themselves to re-crystallize. At ambient temperatures, for example, these polymeric chains of gelatinized amylose molecules in crystalline regions of the starch colloid tend to squeeze and expel the dispersed water molecules out of the colloid. These inter polymer chains pull together to make the gel network shrink and the gelatinized starch gel adhesive separates into two layers; one layer of firm starch gel adhesive, referred to as starch paste and another layer of water. The process described above to form a starch paste is referred to as retrogradation of starch gel adhesive.

In a starch paste the mobility of the water molecules and salt ions herein are considerably reduced. While amylose molecules do contribute to the formation of starch gel adhesive they generally do not significantly contribute to the viscosity. The amylopectin molecules however strongly contribute to the viscosity of a starch gel adhesive and starch paste. Accordingly, the characteristics of starch gels and pastes formed, such described above, depend on the ratio of amylose/amylopectin. Other factors that affect the gel and retrogradation processes include, but are not limited to, temperature, amount of water used, pH of the water used, and concentrations of salt, sugar, fat and/or proteins present.

The Characteristics of Starch Protein Complex:
The flour is powder made of cereal grains, seeds or roots of these plants such as wheat, maize (corn), potatoes, rice and cassava. Flour is a starch protein complex that contains a high proportion of amylose and amylopectin as well as two major types of plant proteins; gliadin and glutenin. These proteins are "conjoined" with the starch molecules to forms a starch protein complex. The starch protein complex when combined with sufficient water forms starch gluten colloid. Wheat flour contains the highest levels of gliadin and glutenin in the cereal grains. Gliadin and glutenin contribute to different properties of the starch gluten. Gliadin gives the starch gluten is sticky and adhesive properties and glutenin gives starch gluten its strength and elasticity.

When a sufficient amount of water is added to wheat flour and the mixture is repeatedly kneaded, the gliadin and glutenin are released from the starch granules and are hydrated to form a gluten polymer. The gluten polymer bonds with water molecules, the starch molecules (amylose, amylopectin) and micro-crystallized starch granules to form an a three dimensional cross-linked gluten network. Repeated mechanical kneading of the results in further cross-linking of the gluten strands to form a gluten matrix inside of a starch protein complex network. Air bubbles that are formed result in a porous gluten network through which water, salt ions and gas can migrate.

It is the physical properties of the porous gluten network that enables the starch gluten colloid to absorb approximately twice its weight in water at exhibit cohesive and elastic properties. Accordingly, starch gluten colloid in some cases provides a suitable medium for a continuous dispersal, diffusion and migration of electrolytes including, but not limited to gas particles, mobile salt ions and water molecules. In accordance with the embodiments of the invention a salt starch gluten colloid is used as an electrolyte for a battery system. Because "salty" materials can attract a number of different fish species, such as Bass, Carp, Salmon and Steelhead, a salt starch gluten colloid also serves as bait in a fishing lure.

In accordance with the present invention a colloidal and porous starch-based compound is changed and/or refilled by a user for replenishing the battery system. The battery system with the starch-based electrolyte is configured to, for example, power a light source or sound source of the fishing lure or other electronic devices. In other embodiments of the invention, a battery system with a starch-based electrolyte is used to power motorized toys, flashlights, starch-based molding toys, electronic lighting ornaments and battery devices with a replaceable starch-based electrolyte.

The battery system of the present invention preferably includes a porous gluten network with an aqueous salt solution as the electrolyte medium, referred to herein as salt starch gluten electrolyte. The salt starch gluten electrolyte is capable of being rheologically molded to a number of different shapes depending on the intended application. The salt starch gluten electrolyte of the battery system is also capable of generating a semi-colloidal starch paste adhesive while the battery system is discharging. The semi-colloidal starch paste adhesive generated by "cold alkali gelatinization" prevents retrogradation and stabilizes the physical properties of the salt starch gluten electrolyte during the operation of the battery system in an aquatic environment.

In accordance with the embodiments of the invention a salt starch gluten electrolyte is prepared by combining about 30% to about 60% starch, about 3% to about 12% ionic salts, about 20% to about 55% water, about 0.5% to about 3% scented oil, about 1% to about 4% food color pigment and/or about 5% edible fluorescent powder and mixing the above materials before adding a sufficient amount of water. The mixture and water is repeatedly kneaded and stretched in, for example, a machine until the salt starch gluten electrolyte is generated. The starch gluten strands in the mixture bind together with dispersed gas bubbles to form a porous starch gluten matrix, such as described above.

Suitable ionic salts used in the preparation of salt starch gluten electrolyte include, but are not limited to, alkali metal and or alkaline earth metal chloride salts such as LiCl, RbCl, KCl, CsCl, BaCl, NaCl, $SrCl_2$, $CaCl_2$, $MgCl_2$. These ions from such salts that disperse in micro-voids of starch gluten matrix by the mechanical kneading process. Preferably, the ionic salt KCl, NaCl and/or $MgCl_2$ because these ionic salts are edible, inexpensive, water soluble and natural salts.

The addition of these chloride salts to a starch can increase the strength, stability, cohesiveness and elasticity of the starch colloid and decrease its viscosity. It is because yield of the starch gluten complex from the starch colloid included with the metal chloride salts is lower than that without the metal chloride salts. Changes of the co-aggregation in the starch gluten polymer-polymer interactions are induced by the dispersed metal salt ions in the starch colloid. Therefore, the formation of starch gluten complexes can cause changes in the rheological properties of a starch gluten colloid electrolyte induced by these chloride salts such as described above, in accordance with embodiment of the invention.

The rheology of the salt starch gluten electrolyte, in accordance with the embodiments of the invention is altered in any number of different ways including, but not limited to, changing the amylose to amylopectin ratio, changing the levels of gluten proteins (gliadin and glutenin), changing the amount of water used, changing the type of salt or salts used, altering the pH level of the mixture and adjusting the temperature at which the salt starch gluten electrolyte is made. Preferably, the anode of the battery system includes an alkali or alkaline earth or boron group metal as battery anode, such as aluminum alloy (1.25V), galvanized steel (1.20V) or alkaline earth metal. The cathode of the battery system preferably includes a corrosion-resistant catalyst metal such as platinized copper (−0.07V), gold (−0.09V), palladium (−0.07V), stainless steel (−0.15V), high nickel-copper alloy (−0.15V). In accordance with further embodiments of the invention the cathode includes conductive surface with nano-particles including, but not limited to, a nano-silver coating, an activated carbon nano-fiber coating or an activated carbon nano-fabric that facilitates gas diffusion and also increases the effective surface area for the half chemical reaction of the battery cell with the proton ($H^+$ ion) reduction at the cathode.

In operation, and as the battery system is discharged, diffused salt ions, water, retained gas, and starch granules form a paste-like region of gel mixture (a starch hydrocolloid) in between cathode and anode, herein referred to as a colloidal starch-salt bridge. The colloidal starch-salt bridge adheres and electrically connects the surfaces of the anode and cathode to further maintain the operation of the battery system and improve generation of the electric current to supply a control circuit and/or a load circuit with output power. The colloidal starch-salt bridge can further act as a binder for starch granules and materials compound of the salt starch gluten electrolyte. This starch binder can prevent the salt starch colloid electrolyte from quickly dissolving in aquatic environment in accordance with embodiment of the invention.

In the embodiments of the invention, the starch colloid battery system is configured to operate a control circuit and/or a load circuit, such as described in detail below. The control circuit and/or load circuit is, for example, integrated into a fishing lure or other device for attracting aquatic life forms. In accordance with the embodiments, the salt starch gluten electrolyte serves as bait as well as enabling the operation of the starch-based battery. To further attract fish or other aquatic life forms the load circuit powers an LED that generates light. The use of LEDs to attract aquatic life forms is further described in the U.S. Pat. No. 7,722,218, titled "METHOD OF AND DEVICE FOR ATTRACTING AQUATIC LIFE FORMS USING AN ELECTROMAGNETIC FIELD GENERATION", the context of which is hereby incorporated by reference.

BRIEF DESCRIPTION OF THE DRAWINGS

FIGS. 2A-C show representations of a starch-based battery system for replacing conventional dry batteries, in accordance with the embodiments of the invention.

DETAILED DESCRIPTION OF THE INVENTION

Figure 1:
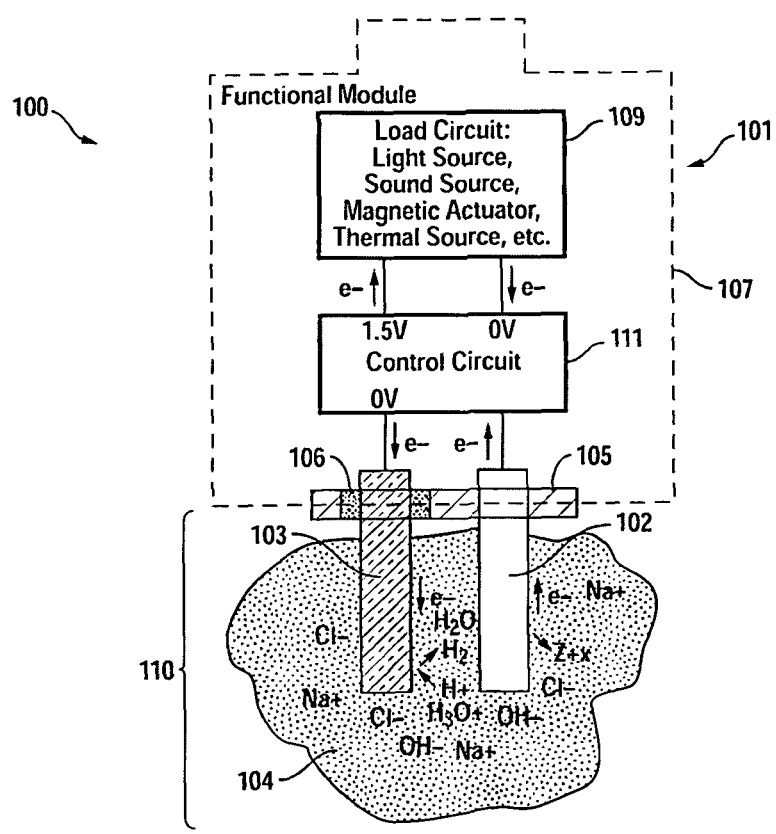
FIG. 1 is a schematic representation of a device with battery system using a salt starch colloid electrolyte, in accordance with the embodiments of the invention.

Referring to FIG. 1 the present invention is directed to a device 100 for generating electro-chemical energy from a starch-based battery system to power a load circuit. The device 100 includes a functional module 101 and a starch-based battery 110. The starch-based battery 110 herein refers to any battery that uses a starch-based electrolyte 104 with any number of different electrodes, but includes at least one anode 102 and one cathode 103. The starch-based electrolyte 104 is tailored to have any number of physical properties such as rheology, viscosity, salinity, stickiness and shapes, according to the intended application. The functional module 101 includes a housing structure 107 that encases a control circuit 111, a load circuit 109, terminal blocks 105 and 106, and a portion of the anode 102 and cathode 103. In accordance with the embodiment of the invention, the starch-based electrolyte 104 can be even operated without any electrolyte container. Preferably the starch-based electrolyte is replaceable and/or rheologically deformable.

In accordance with the embodiment of the invention the terminal block 105 is electrically conductive and the terminal block 106 an insulation separator. The cathode 103 is preferably formed from a corrosion-resistant electro-chemical catalyst electrode that includes a conductive substances such as gold, platinized copper, stainless steel, high nickel-copper alloy, a nano-silver particle coating surface, activated nano-carbon fabric and/or combinations thereof. The anode includes 102 is preferably formed from an alkali metal, alkaline earth metal and/or boron group metal. Preferably, both the anode 102 and cathode 103 are formed from toxic free and environmental friendly materials.

The control circuit 111 preferably includes some all of the necessary energy conversion circuits, and components, such as an ASIC required for converting and regulating the energy from the starch colloid battery 110 to power the load circuit 109. The electrodes 102 and 103 are configured to electrically couple to the control circuit 111 and convert electro-chemical energy of the battery 110 to an appropriate output voltage and current to power the load circuit 109 when the starch-based electrolyte 104 is contacted with and/or attached on the surfaces of the electrodes 102 and 103. The load circuit 109 preferably includes a light source, such as visible color LED and/or ultraviolet (UV) LED, a sound source, such as a piezoelectric buzzer speaker, a magnetic actuator, such as a magnetic moving coil or motor, an electrical thermal source, such as a heater element, or any combination thereof The load circuit 109, the control circuit 111 and portions of the anode 102 and cathode 103 are preferably mold or encase within a housing structure 107, such that they are water-proofed. As described above, the starch-based electrolyte 104 preferably comprises wheat flour, sodium chloride, food color pigment, edible scent materials, fluorescent materials and/or combinations thereof, according to the intended application of the embodiment of the invention.

General Theory of the Starch-Based Battery:

Where the starch-basted electrolyte 104 of the starch-based battery 110 is a porous salt starch gluten electrolyte, the composition within the starch gluten network is preferably homogenous with molecules of water and ionic sodium salt, NaCl. The molecules of solid sodium salt, NaCl(s) are, for example, completely dissolved in the water to produce Na$^+$ cations and Cl$^-$ anions and lower the energy needed for the water molecules to split into hydroxide ion OH— and hydrogen ion H$^+$ by a process of self-ionization. The hydrogen ions quickly combine another water molecules and form hydronium ions, H$_3$O$^+$ by the process of autoprotolysys, as illustrated below:

Dissolved in H$_2$O Liquid

(1)

Self-Ionization in Equilibrium State

(2), and/or

Autoprotolysis in Equilibrium State

(3)

When an alkali, alkaline earth and/or boron group metal anode 102 (represented by Z below) and a catalyst cathode 103 is contacted with the starch-based electrolyte 104, the battery 110 is activated and develops a potential voltage across the terminals of the electrodes 102 and 103. When the load circuit 109 is electrically connected to the electrodes 102 and 103 through the control circuit 111, electric current energizes the load circuit 109 and the following chemical reduction-oxidization reactions occurs:

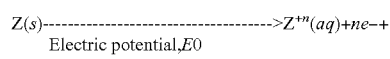

For example, where the anode 102 is formed from an aluminum alloy, as a typical boron group metal, the aluminum alloy is oxidized to form aluminum ions, $Al^{3+}$ (aq) on the anode surface:

$$Al(s) \longrightarrow Al^{3+}(aq) + 3e^- + \text{Electric potential}, E0$$

The overall electric potential of Al alloy anode is approximately +1.25V. The $Al^{3+}$ ions form an interfacial double layer around the surface of anode 102 and the $H^+$ ions and/or $H_3O^+$ ions in the starch electrolyte migrate to the surface of the electro-catalyst cathode 103 where the H+ ions and/or $H_3O^+$ ions are reduced to form hydrogen gas, $H_2$ as shown in following chemical reduction reaction:

$$H^+(aq) + 2e^- \longrightarrow H_2(g), \text{ and/or}$$

$$2H_3O_+(aq) + 2e^- \longrightarrow 2H_2O(l) + H_2(g) + \text{Electric potential}, E0'$$

The relative electric potential, E0' (referred to platinum (Pt) as the 0V standard hydrogen electrode) generated at the cathode 103 depends on the type of the electro-chemical catalyst that is used to form the cathode 103 and the activation over-potential voltage of hydrogen gas generated on that cathode 103. For example, high nickel-copper alloy (E0'=−0.15V) and platinized copper (E0'=−0.07V). Where platinized copper form the cathode 103, the electric potential voltage of the battery cell generated is approximately +1.18V.

In accordance with embodiment of the invention, the catalyst surfaces of the cathode 103, for examples, platinum alloy, palladium or activated nano-coatings, can reduce the hydronium ions (H3O+ ions) to hydrogen (H) atoms by lowering the activation energy of the red-ox half-reaction. These catalyst surfaces can further activate and catalyze the hydrogen (H) atoms to form hydrogen gas molecules (H2) on the cathode. The hydrogen gas molecules that emit to outside environment through dispersed micro voids of the starch gluten matrix will not accumulate within the starch colloid electrolyte.

FIGS. 2A-2C show a battery device 200 that includes cap module 221 and a starch-based electrolyte cartridge 210. The cap module 221 and the starch-based electrolyte cartridge 210 are configured to form a battery size that is similar to that of a standard dry cell battery size, such as a "AA", "C" or a "D" size dry cell battery. The battery device 200 is preferably capable of replacing a conventional dry cell battery of the same or similar size.

The cap module 221 includes a housing structure 220 and a control circuit 219, such as the control circuit 111 described above (FIG. 1), a terminal metal contact 208, metal catch pieces 215 and 215', latch lever pieces 217 and 217', a non-conductive insulation separator 206 and an alkali metal or alkaline earth metal anode 202. The control circuit 111 is configured to convert and regulate a nominal cell voltage, 1.5V of a conventional dry cell battery.

The starch-based electrolyte cartridge 210 includes a starch-based electrolyte 214, such as described above, a cylindrical conductive electro-catalyst cathode 203, and an end cap metal contact 209 contained within a cylindrical container tank 201. The container tank 201 is sleeved and fitted with the cylindrical catalyst cathode 203. Both the cylindrical container tank 201 and the cylindrical catalyst cathode 203 have a bottom opening that allows the end cap metal contact 209 to be placed in electrical contact with the cylindrical catalyst cathode 203. The cylindrical catalyst cathode 203 preferably includes two movable and conductive spring latches 213 and 213' that lock with and contact with the metal catch pieces 215 and 215' of the top cap module 221 to form the battery system 200. The cylindrical catalyst cathode 203, in accordance with the embodiments of the invention, includes an activated nano-carbon fabric/cloth, platinized copper coating and/or a combination thereof to help facilitate the release and/or diffusion of hydrogen gas that is generated and to increase the effective surface area on the catalyst cathode 203 for the electro-chemical reaction, therefore, gives the battery system 200 a higher discharging current density.

Still referring the FIG. 2A, in the operation of the battery device 200 is formed by coupling the starch-based electrolyte cartridge 210 with the cap module 221. In doing so, the nominal cell voltage that generated between terminal metal contact 208 and the end cap metal contact 209 is approximately +1.5V. When the battery system 200 is coupled to an external load circuit through the terminal metal contact 208 and the end cap metal contact 209, elections (e) flow to provide power to the external load circuit (not shown) according to the chemical principles described previously.

FIG. 2B shows a perspective view of the battery system 200 that is formed by the assembly of the cap module 221 and the starch-based electrolyte cartridge 210. When the starch-based electrolyte cartridge 210 is exhausted or depleted, the top cap module 221 and the starch-based electrolyte cartridge 210 are disassembled, such as shown in FIG. 2C and the starch-based electrolyte 214 and/or the starch-based electrolyte cartridge 210 is replaced. The cap module 221 and the starch-based electrolyte cartridge 210 are disassembled by, for example, depressing the latch lever pieces 217 and 217' to unlock the conductive spring latches 213 and 213' (FIG. 2A) from the metal catch pieces 215 and 215' (FIG. 2A) positioned on the inside surface of the cap module 221

Figure 3A:
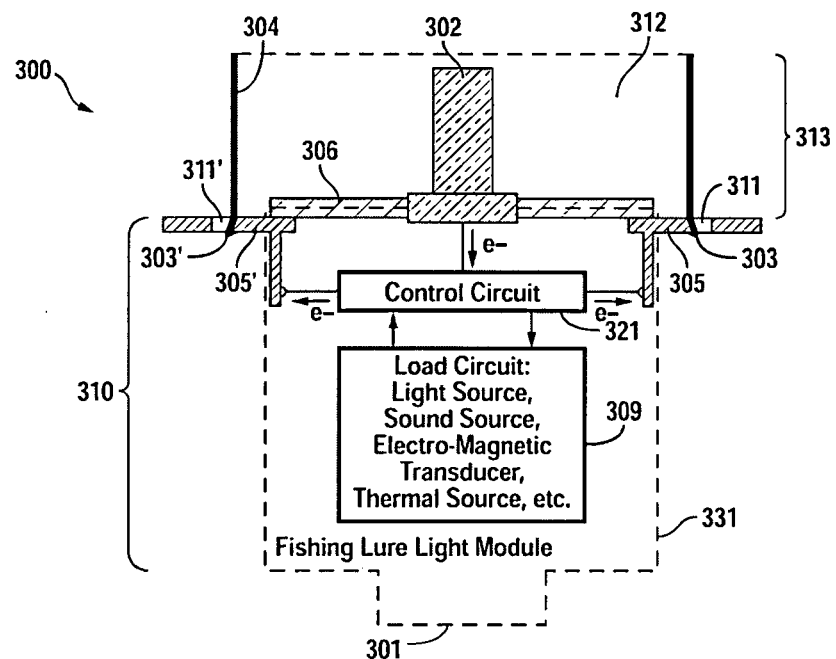
FIGS. 3A-B show a cross-sectional view and an exploded view, respectively, of a device with a detachable starch-based electrolyte carrier cage, in accordance with the embodiments of the invention.
Figure 3B:
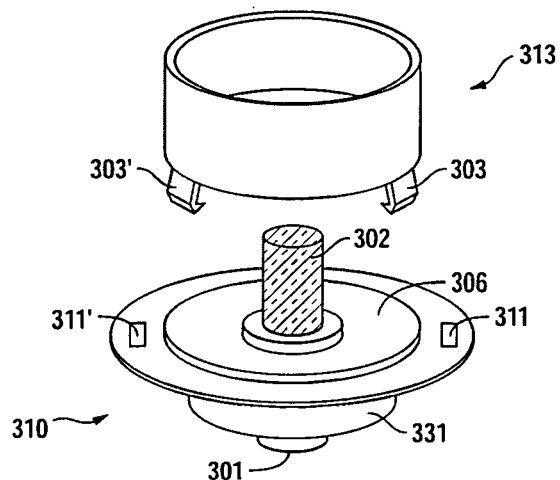

FIG. 3A-B illustrate a battery device 300 that includes a control module 310 and a detachable starch colloid carrier cage 313. The control module 310 includes a control circuit 321 and a load circuit 309 and waterproof and translucent housing structure 331. The control circuit 321 includes all the necessary circuitry to convert and regulate the voltage and current generated from the battery device 300 to operate the load circuit 309. The load circuit 309 powers any number of electrical devices 301, such as an LED light and/or a sound source that, for example, includes a piezo-electric buzzer speaker. The control module 310 in accordance with this embodiment of the invention, is configured to be activated to emit pulsed light and sound according to any number of pre-programmed light patterns and sound data files on a circuit board of the control circuit 321. In accordance with a preferred embodiment of the invention, the battery device 300 is a fishing lure configured to attract the fish or other aquatic life forms in an aquatic environment, such as described below with reference to FIG. 7.

The control module 310 preferably also includes a replaceable metal anode 302, a non-conductive insulation separator 306, and at least two metal catches 305 and 305'. The replaceable anode 302 is formed from an alkali, an alkaline earth or a boron group metal and/or the combination thereof The detachable starch colloid carrier cage 313 includes an inner surface 304 that not only act as a cathode but also enlarge the effective surface area for packing up and reducing more H+ protons and/or hydronium ions of the half electro-chemical reaction, with the starch colloid carrier cage 313 coupled to the control module 310. The means can increase the discharging current capacity of the battery device in accordance with the embodiment of the invention. The starch colloid carrier cage 313 has at least two movable and conductive spring latches 303 and 303' or latching method of the same that are preferably configured to electrically contact and lock with the two metal catch pieces 305 and 305' through two latching holes 311 and 311' and form a cavity 312. The two metal catch pieces 305 and 305' are preferably formed from a high nickel-copper alloy, stainless steel and/or any other suitable electrochemical catalyst materials as described above.

In operation, the cavity 312 is filled and refilled with a salt starch colloid electrolyte, such as described above and the battery device 300 is activated. Preferably, the detachable starch colloid carrier cage 313 and/or the inner surface of the starch colloid carrier cage 313 is made of stainless steel. The detachable starch colloid carrier cage 313 is readily separated from the control module 310, as shown in FIG. 3B, by displacing the conductive spring latches 303 and 303' and guiding the conductive spring latches 303 and 303' through the latching holes 311 and 311'.

Figure 4A:
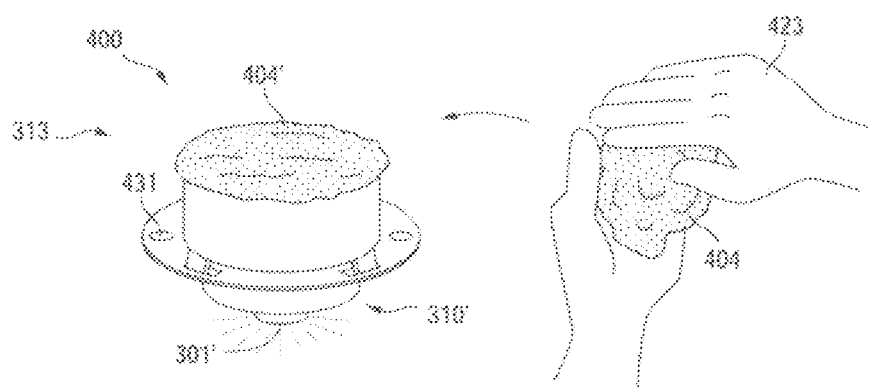
FIGS. 4A-B are show a starch-based gluten electrolyte being placed in a carrier cage to activate and power a light module, in accordance with the embodiments of the invention.

FIG. 4A shows the fishing lure device 400, in accordance with the embodiments of the invention. Similar to the battery device 300 described above, the fishing lure device 400 includes a control module 310'. The control module 310' includes an anode, a control circuit, a load circuit and electronic device 301', such as an LED light source and/or sound source. Also, the control module 310' preferably includes one or more apertures 431 for coupling the fishing lure device 400 to fishing line, fishing hooks or other fishing implements.

The fishing lure device 400 further includes a detachable carrier cage 313, that acts as a cathode portion of the battery for the fishing lure device 400. In operation a starch-based electrolyte 404 is molded by, for example, by a user's hands 423 and the molded starch-based electrolyte 404' is place into the cavity, as shown in FIG. 3A, formed by the control module 310' and the detachable carrier cage 313. In accordance with further embodiments of the invention, by a user's hands 423, the starch-based electrolyte 404' can also be directly molded around the control module 310' so that the electrolyte adhesively contacts with and/or attaches on surfaces of the anode and the cathode of the control module 310'. The battery circuit of the fishing lure device 400 is then completed and the electrical device 301' is energized. As described previously the starch-based electrolyte 404 further includes any number of fragrances or additives that entice aquatic life forms and/or encourage aquatic life form to eat the molded starch-based electrolyte 404' as bait. The detachable carrier cage 313 of the fishing lure device 400 not only serves as fishing bait cage, but also controls the dispersion of starch gluten granules with salt, fluorescent materials and scent particles from an interface layer of the molded starch-based electrolyte 404' into an aquatic environment.

Figure 4B:
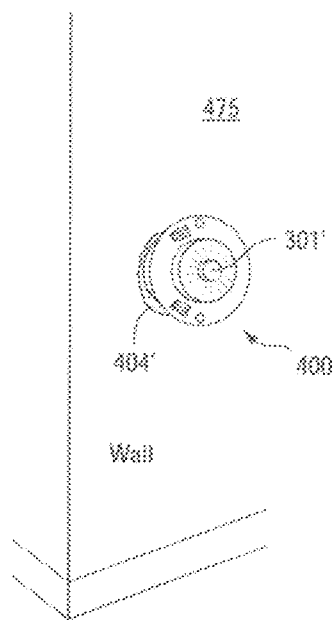
Figure 6:
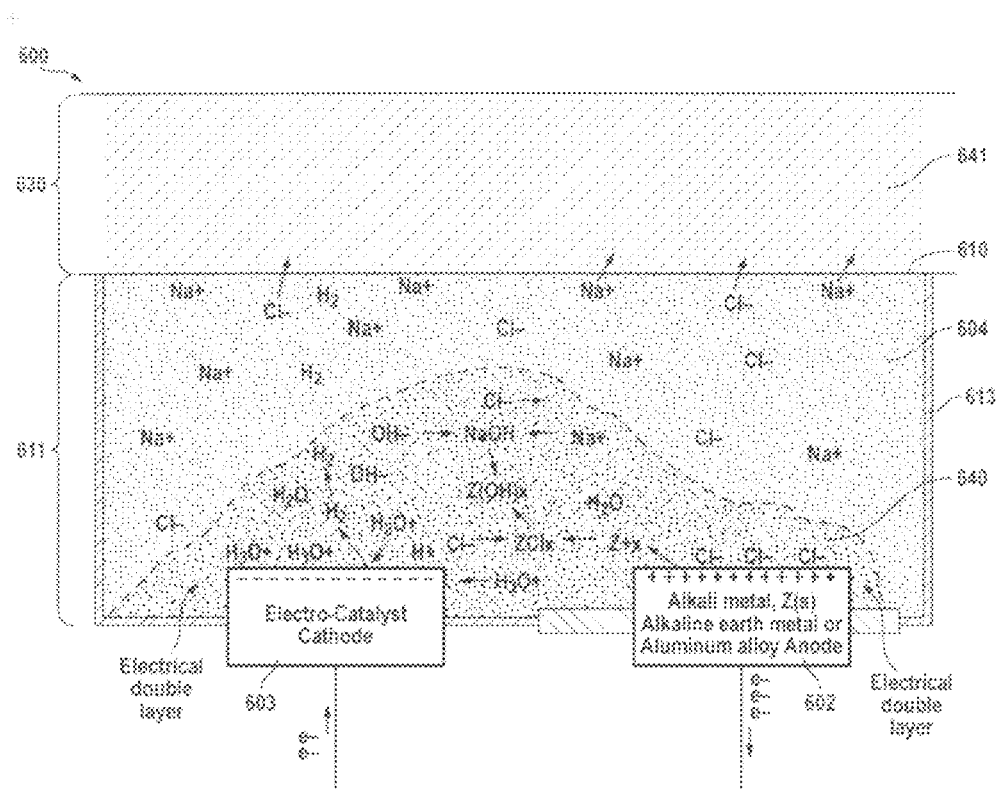
FIG. 6 is a cross-sectional view of a salt starch colloid battery system with different continuous dispersed mediums and a gel-adhesive like salt bridge, in accordance with the embodiments of the invention.

Referring to FIG. 4B, other than the application as the fishing lure device 400, the battery device 400 once activated can further continue to generate a semi-colloidal starch gel adhesive from the molded starch-based electrolyte 404', as described in FIG. 6. The device 400 can then be attached to a surface, such as a wall 475, wherein the battery device 400 as a self-adhesive flashlight or lighting ornament will continue to be powered and the electrical device 301 energized on the surface.

Figure 5A:
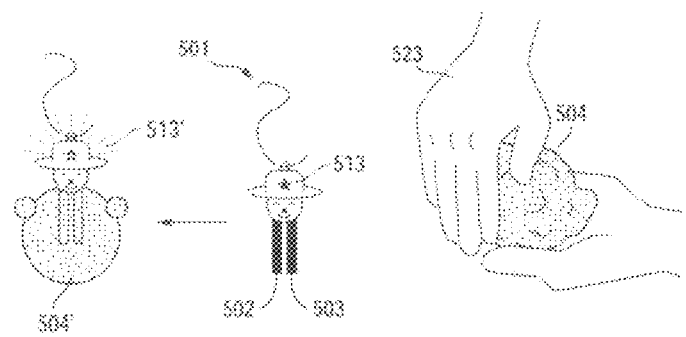
FIGS. 5A-B show representations of a rheologically molded salt starch colloid electrolyte with different shapes in a battery system used to power a lighting ornament and a motorized toy, respectively, in accordance with the embodiments of the invention.

FIG. 5A shows an ornament 501, that is powered by a starch-based battery similar to that described above. The ornament 501 includes a control module portion (control circuit and load circuit) with an electronic device 513, such as a light source, sound source, magnetic moving coil and/or a micro heater element (as scented oil warmer), and two electrodes 502 and 503 (an anode and cathode, respectively) formed from suitable materials, described above. In operation, a starch-based electrolyte 504 mixed with specific scent oil/additives are rheological molded by, for example, a user's hands 523. The modeled starch-based electrolyte 504' is then place in contact with the electrodes 502 and 503 to power ornament 501, energize the electronic device 513 and generate light 513' noise, scent and/or a combination thereof. In accordance with embodiment of the invention, the electrolyte 504' of the starch-based battery is operate without an electrolyte container.

Still referring to FIG. 5A, preferably, the starch-based electrolyte 504 further includes UV curing additives such as photo-initiators, oligomers and monomers. Also, the electronic device 513 includes some UV LEDs as a light source. When the modeled starch-based electrolyte 504' contacts with the electrodes and energizes the electronic device 513 to emit UV light 513', the UV light emitted from the electronic device 513 can be configured to project on surfaces of the modeled starch-based electrolyte 504' itself. Thus, the rheological surfaces of starch-based electrolyte 504' can be cured per a preset modeled figure whereas portion of the starch colloid within the starch-based electrolyte 504' can still operate until the battery electrolyte is exhausted, in accordance with further embodiments of the invention.

Figure 5B:
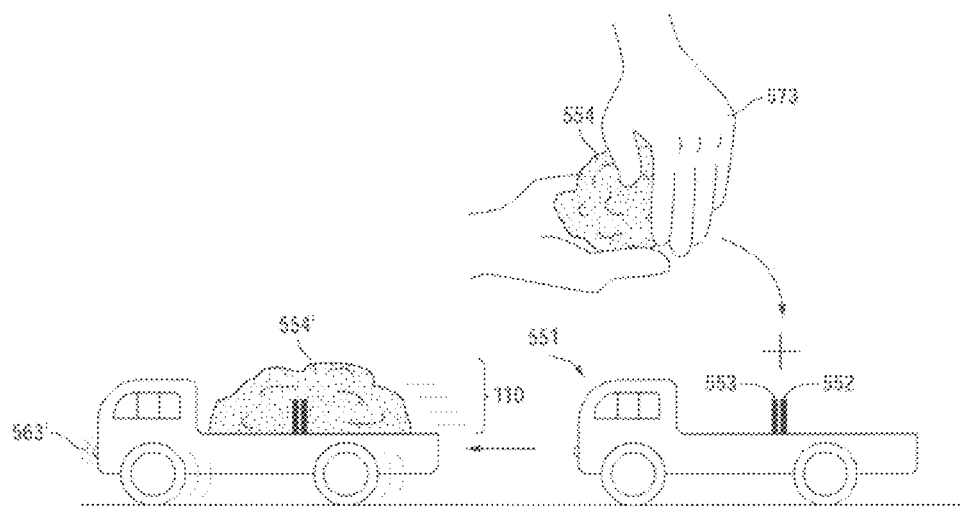

In accordance with further embodiments of the invention, a starch based battery system is used to power and operate a toy 551, such as shown in FIG. 5B. The toy 551, in this case a toy vehicle, includes all of the necessary electronics, such as a control circuit and load circuit, for powering an electronic device or devices 563', such as a motor, a light source, a sound generator, magnetic moving coils (an actuator) and/or a combination thereof. The toy includes two electrodes 552 and 553 (an anode and cathode, respectively) formed from a suitable material or materials. In operation, a starch-based electrolyte 554 is molded, by a user's hands 573. The molded starch based electrolyte 554' is placed in contact with the two electrodes 552 and 553 and the battery system of the toy 551 is powered to energize the electronic device or devices 563'

It will be clear to one skilled in the art from the discussion above that the starch-based battery of the present invention is capable of being used to power any number of different electronic devices. Further. it will be clear to one skilled in the art that the physical properties (rheology) of the starch-based electrolyte of the present invention can be modified through additives, such as alkali and alkaline metal salts (e.g. LiCl, $MgCl_2$, KCl, $CaCl_2$ and NaCl) and/or altering the preparation conditions of the starch-based electrolyte. In accordance with the embodiments of the invention a pre-mixed starch-based electrolyte, the detachable starch colloid carrier cage and/or container tank is packaged or sold with one or more products utilizing the starch-based battery system or the present invention.

Operation of a Starch-Based Battery System in an Aquatic Environment:

The FIG. 6 is used to illustrate how the use of the starch-based battery system of the present invention is particularly well suited for operation within an aquatic environment.

FIG. 6 shows a cross-sectional view of a starch colloid battery device 600 that interfaces and contacts a continuous dispersed medium, such as a water medium 630. The water medium 630 is a mixture of water molecules, gas or air molecules and solid particle 641. The starch colloid battery 611 herein includes an electro-catalyst cathode 603, a solid Z metal anode 602 (alkali or alkaline earth metal or aluminum alloy Al), a starch colloid carrier cage 613 and a salt starch gluten colloid 604, wherein the carrier cage 613 is preferably configured to detachably coupled with the cathode 603 to become a portion of the cathode 603, such as described in detail above. The free ions, including $H_3O^+$, $OH^-$, $H^+$, $Na^+$ and $Cl^-$, and water molecule $H_2O$ are evenly dispersed in the porous starch protein dispersed matrix of the starch gluten colloid to form colloidal salt starch-based electrolyte 604.

When the Z metal or Al anode 602 and the catalyst cathode 603 are immersed in the colloidal salt starch-based electrolyte 604, the anode 602 oxidizes to form $Z^{x+}$ or $Al^{3+}$ ions, which generates a positive surface charge layer on the anode 602 with a surface potential E0. At the same time, $H_3O+$ and/or $H^+$ ions migrate to the surface of the catalyst cathode 603 and are reduced to hydrogen gas $H_2$. Simultaneously, the starch colloid battery device 600 continuously generates more and more hydroxide $OH^-$ ions because of chemical equilibrium of the half reaction (2) and/or (3) as described above and forms a negative surface charge layer on the cathode 603, with a lower surface potential E0'. Under the electric potential difference (E0'−E0) between the electrodes 602 and 603, anions (such as $Cl^-$ and $OH^-$) migrate towards the anode 602 and cations (such as $Z^{x+}$ and $Na^+$) migrate towards the cathode 603, thus producing an electrical double layer, as shown in FIG. 6. The electrical double layer facilitates the electrochemical reaction to generate continuous electron current e- and further helps to prevent particles from coagulating on the surfaces of anode 602 and cathode 603.

The electrical double layer of the salt starch colloid electrolyte 604 includes a substantially homogenous dispersion of starch protein granules, self-ionized water ions ($H_3O^+$, $OH^-$ and $H^+$), sodium chloride ions ($Na^+$ and $Cl^-$), water molecules ($H_2O$) and re-dox reaction products ($Z^{x+}$ and $H_{2(g)}$) within the porous gluten structures. Sufficient water with these cations and anions are capable osmosis and migrating through the porous structures under influence of the electric potential difference (E0'−E0) between the anode 602 and cathode 603. Particles of alkali hydroxide Na(OH), boron group hydroxide and/or alkaline earth hydroxide particles $Z(OH)_x$ are formed in a zone between the cathode 603/inner surface of the carrier cage 613 and anode 602, which results in a high concentration of the alkali sol, as a series of chemical processes shown in FIG. 6. The alkali sol in the region 640 results in the formation of a starch protein complex and granules, or semi-colloidal starch gel adhesive, in a process of "cold alkali gelatinization," without a heating process. The region 640 of gelatinized starch gel adhesive, like the starch hydrocolloid described above, in some cases will gradually spread to and cover the surface of the anode 602, cathode 603 and portion of the inner surface of the carrier cage 613, as shown in FIG. 6. In mechanism of the hydrocolloids, gelling is connected to starch polymer-polymer, polymer-solvent and/or polymer-salt electrolyte ions (e.g. K+, Na+, Mg+2, Ca+2) interactions. The starch polymer chain bridges to another chain through these salt ions and form a cross-linking colloidal gel adhesive.

In operation of the starch colloid battery device 600, more and more products of alkali and/or alkaline earth metal ions such as $Ca^{2+}$, $K^+$ and $Mg^{2+}$ are generated from the anode 602 and disperse within the starch polymer chains. Because more these dispersed ions bridge other starch polymer chains in the zone 640, these cross-linking colloidal gel adhesive can further strengthen the gelling adhesive structure of the starch-based electrolyte 604 while the battery 611 discharges.

The gelling characteristics of the starch adhesive structure is directly proportional to charged vacancy of the metal ion dispersed within the starch polymer chains in zone 640. For example, gelling power of a starch adhesive structure with metal ions of more charge vacancy is relatively greater than that with metal ions of less charge vacancy, e.g. Starch gelling power ranking that is caused by the metal ion generated from the Z anode is: $Al^{3+} > Mg^{2+} > Ca^{3+} > Na^+ > K^+$.

The gelatinized starch gel adhesive dispersed in the porous gluten structures in the region 640 can act as a starch binder of the starch colloid electrolyte 604 in accordance with embodiment of the invention.

The starch gluten colloid mixture in zone 640 can adhesively cross-link the anode 602 and the cathode 603 and add structural integrity to the starch-based electrolyte 604, which helps to ensure that the salt starch colloid electrolyte 604 remains sitting within the starch colloid carrier cage 613 and/or cohesively attaching on surfaces of the electrodes 602 and 603, even in an aquatic environment. Further, the processes described above helps to facilitate a controlled time release of scents, fragrances, fluorescent granules and other materials contained within the salt starch colloid electrolyte 604 and/or by products of the battery system 600 as the battery system 600 discharges.

Figure 7:
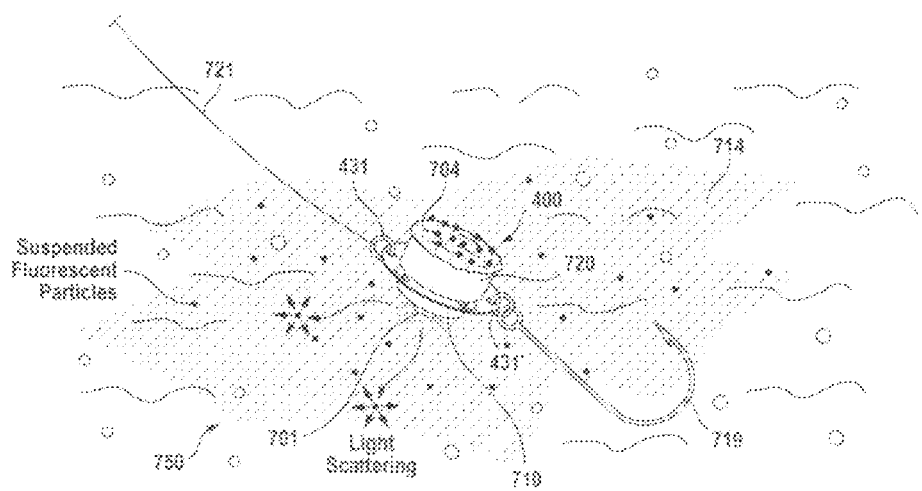
FIG. 7 is a representation of a fishing lure light device that includes a fishing lure light module and a replaceable starch electrolyte carrier cage filled with a scented salt starch dough bait mixing color pigment and fluorescent particles operating in aquatic environment, in accordance with the embodiments of the invention.

FIG. 7 shows an illustration of a the fishing lure light device 400, such as shown in FIG. 4A, within an aquatic environment 750. The fishing lure light device 400 operates according to the principles described above with reference to FIG. 4A. The fishing lure light device 400 has a detachable carrier cage 720 and control module 710 with an electronic device 701, such as a LED light source, a sound source or combination thereof. In operation a starch-based electrolyte 704, that also acts as a dough bait for attracting aquatic life forms, is placed in the detachable carrier cage 720 as in FIG. 6 and the electrical device 701 is thus activated and energized by the battery formed. In accordance with this embodiment of the invention, one or more apertures 431 and 431' are used for attaching the fishing lure light device 400 to a fishing line 721, a fishing hook 719 and/or any other suitable fishing implement. The starch-based electrolyte 704 includes a color pigment, a scented material, fluorescent granules and/or salt particles within the wheat starch gluten, such as described previously. While the battery system is powering the electronic device 701, a plume 714 is generated within the aquatic environment 750 which attracts fish or other aquatic life forms. As mentioned previously, the plume 714 includes, for example, salts, scents, suspended fluorescent particles and colored starch protein granules that are controllably released by the starch-based electrolyte 704 and/or are generated while the battery system of the fishing lure light device 400 discharges to power the electronic device 701 underwater. In accordance with the embodiments of the invention, the starch-based electrolyte 704 with the dispersed materials as described above and/or chemical product materials that are generated while the battery system of the fishing lure light device 400 discharges are environmentally friendly and/or biodegradable. The high salt content of the starch-based electrolyte 704 helps not only to preserve the starch-based electrolyte 704 for extended shelf-life, but also to attract the fish species through the salty bait underwater.

In accordance with this embodiment of the invention, while the light source of the electronic device 701 emits pulsed light, the suspended starch gluten granules with fluorescent particles dispersing around the plume 714 can adsorb the light from the light source of the electronic device 701 in aquatic environment. The plume 714 of starch gluten granules including the colloidal particles of fluorescent materials, scents and color pigment as a bait food underwater can glow and/or scatter the light from the light source 701 to mimic a cloud of dispersing zooplankton for example, hill and copepod generating natural living light to lure fish or other aquatic life forms in dark aquatic environment as shown in FIG. 7.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A device comprising:
   a) electrodes;
   b) a molded starch-based electrolyte that includes starch in an amount of thirty or more percent by weight and alkali metal salt or alkali earth metal salt in an amount of three or more percent by weight; and
   c) an open base, an open container or an open cage surrounding a portion of the electrodes for holding the molded starch-based electrolyte in contact with the portion of the electrodes, wherein a voltage is generated between the electrodes when the molded starch-based electrolyte is placed in electrical communication with the portion of the electrodes.

2. The device of claim 1, further comprising a control circuit that is electrically coupled to the electrodes for controlling an output power.

3. The device of claim 2, further comprising an electronic device that is activated or powered through the load circuit when the molded starch-based electrolyte is placed in electrical communication with the portion of the electrodes.

4. The device of claim 3, wherein the electronic device is attached to the open base, the open container or the open cage.

5. The device of claim 3, wherein the electronic device is selected from the group consisting of a light source, a sound source, a magnetic actuator, motor and a heating element.

6. The device of claim 3, further comprising a water proof housing for housing the control circuit and the electronic device.

7. The device of claim 6, wherein the open base, the open container or the open cage for holding a molded starch-based electrolyte detachably couples to the water proof housing.

8. The device of claim 1, wherein at least one of the electrodes is detachably coupled to a surface of the open base, the open container or the open cage.

9. The device of claim 1, wherein the molded starch-based electrolyte is self-gelatinizing to improve structural integrity and forms a gelling adhesive that attaches to portions of the electrodes and reduces dissolution of the molded starch-based electrolyte in an aquatic environment.

10. The device of claim 3, wherein the electronic device is a fishing implement and operated within an aquatic environment.

11. The device of claim 1, wherein the electrodes include an anode within or on the open base, an open container or an open cage and a cathode within or on the open base, the open container or the open cage.

12. The device of claim 11, wherein the cathode includes a fabric or cloth material.

13. The device of claim 11, wherein the anode comprises one or more of an alkali, an alkaline earth and a boron group metal.

14. The device of claim 11, wherein the cathode comprises one or more of platinized copper, gold, palladium, stainless steel and high nickel-copper alloy.

15. The device of claim 14, wherein the cathode further comprises one or more of a nano-silver coating and an activated carbon nano-fiber coating or carbon nano-fabric coating.

16. A method of making a battery system comprising:
   a) providing an open base, an open container or an open cage with electrodes that are at least partially surrounded by the open base, the open container or the open cage; and
   b) forming a molded starch-based electrolyte and placing the molded starch-based electrolyte in contact with portions of electrodes, such that the a voltage is generated between the electrodes.

17. The method of claim 16, further comprising electrically coupling an electronic device to the electrodes to activate or power the electronic device.

18. The method of claim 17, wherein the electronic device is selected from the group consisting of a light source, a sound source, a magnetic actuator, motor and a heating element.

19. The method of claim 16, wherein the electronic device is electrically coupled to the electrodes through a control circuit.

20. The method of claim 16, wherein the molded starch-based electrolyte is a salt starch gluten electrolyte.

21. The method of claim 20, wherein the salt starch gluten electrolyte is formed by mechanically mixing starch in a range of 30% to 60%, ionic salt in a range of 3% to 12% and water in a range of 20% to 55%.

22. The method of claim 21, wherein the ionic salt includes one or more of LiCl, RbCl, KCl, CsCl, BaCl, NaCl, $SrCl_2$, $CaCl_2$ and $MgCl_2$.

23. The method of claim 22, wherein the salt starch gluten electrolyte further includes one or more of a scented powder, an oil, a fluorescent material and a color pigment.

24. The method of claim 16, wherein the electrodes include an anode comprising one or more of an alkali earth, an alkaline earth and a boron group metal.

25. The method of claim 16, wherein the electrodes include a cathode comprising one or more of platinized copper, gold, palladium, stainless steel and high nickel-copper alloy.

26. The method of claim 25, wherein the cathode further comprises one or more of a nano-silver coating and an activated carbon nano-fiber coating or carbon nano-fabric coating.

27. The method of claim 25, wherein a gas is diffused from a surface of the cathode.

* * * * *